No. 624,725. Patented May 9, 1899.
G. A. ANDERSON.
SPRING WHEEL.
(Application filed Sept. 24, 1898.)
(No Model.) 5 Sheets—Sheet I.
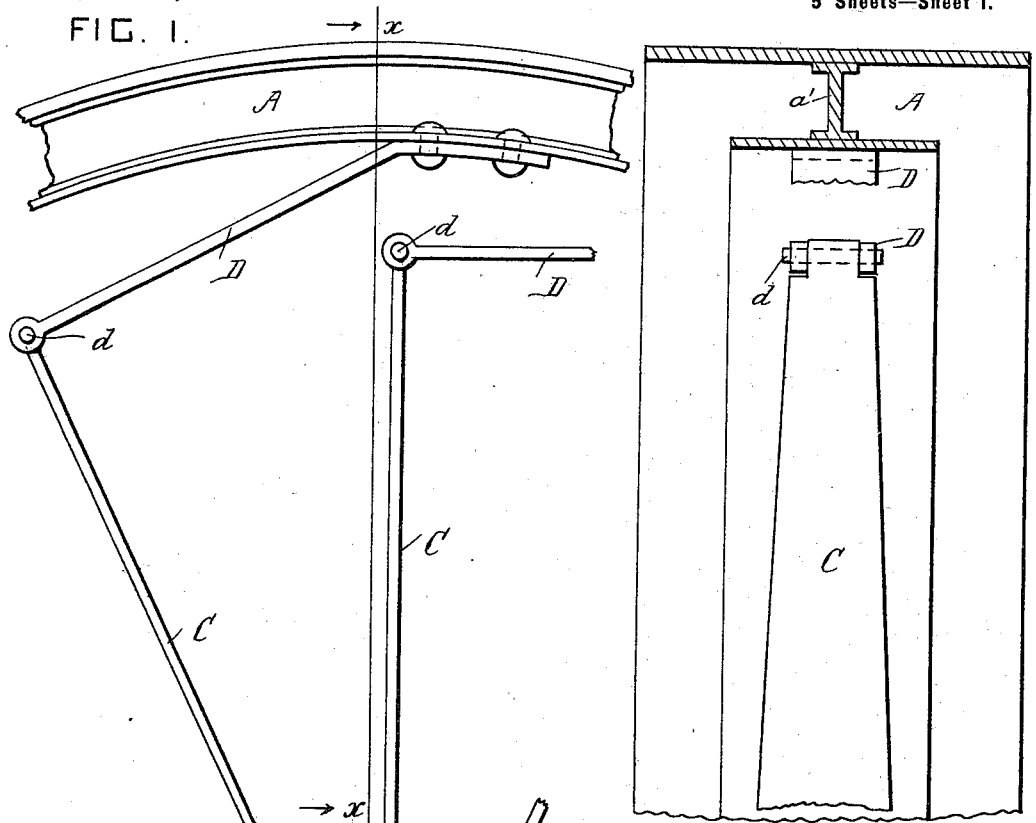
FIG. 1.
FIG. 2.
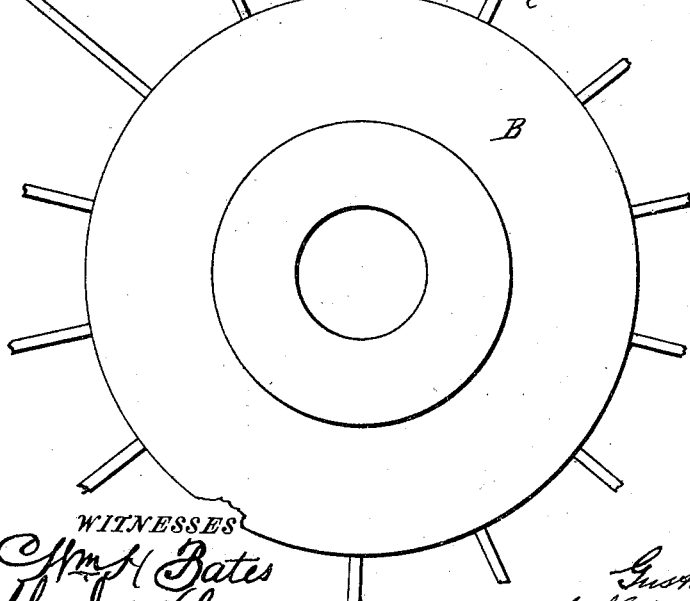
WITNESSES
Wm H Bates
Charles N Gray
INVENTOR
Gustaf A. Anderson.
by Herbert W. T. Jenner.
Attorney No. 624,725. Patented May 9, 1899.
G. A. ANDERSON.
SPRING WHEEL.
(Application filed Sept. 24, 1898.)
(No Model.) 5 Sheets—Sheet 2.
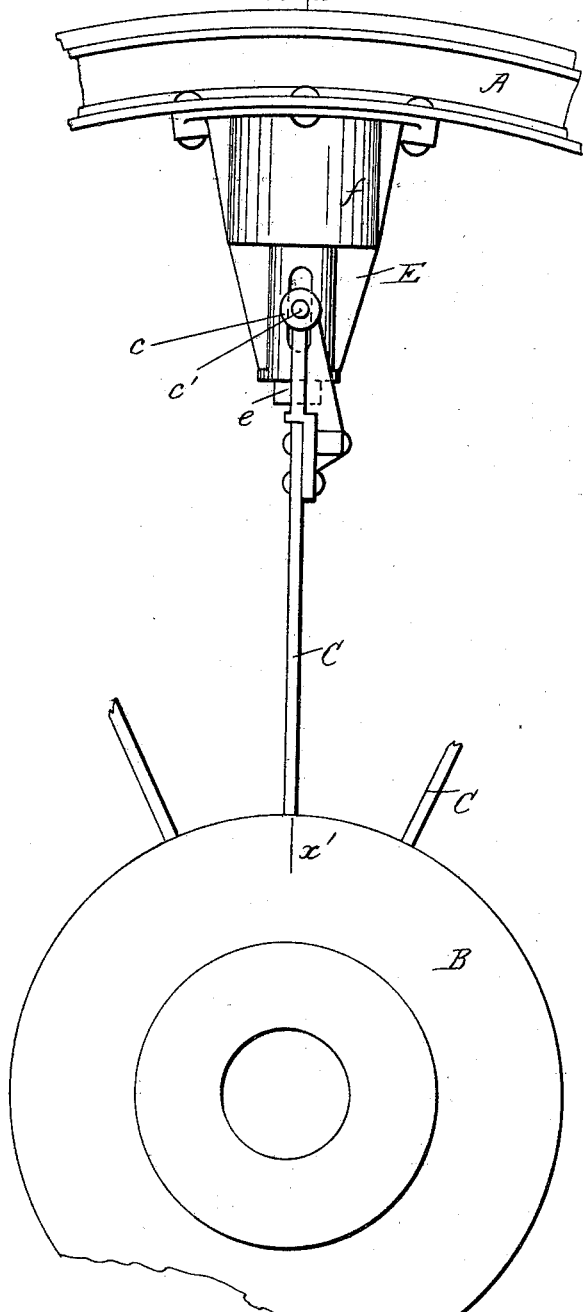
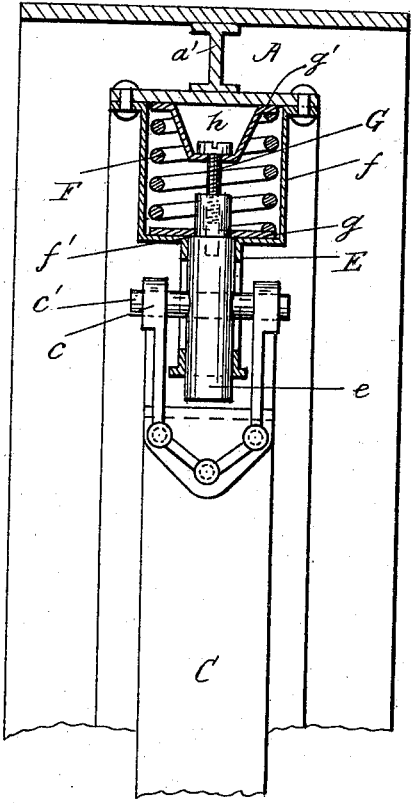
WITNESSES
Wm H Bates
Charles H Gray
INVENTOR
Gustaf A. Anderson
by Herbert W. T. Jenner
Attorney No. 624,725. Patented May 9, 1899.
G. A. ANDERSON.
SPRING WHEEL.
(Application filed Sept. 24, 1898.)
(No Model.) 5 Sheets—Sheet 3.
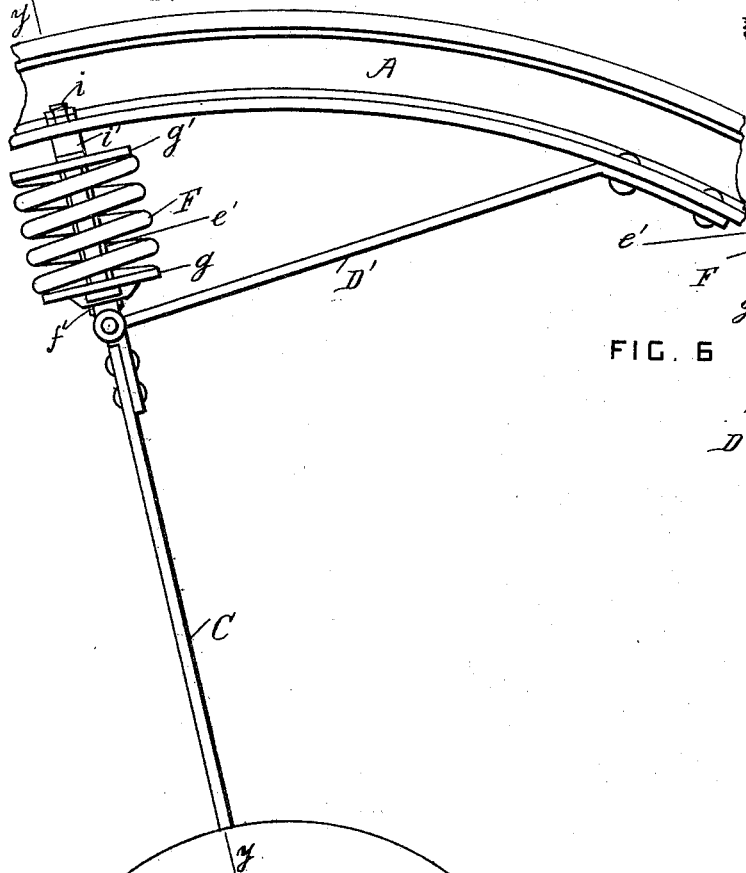
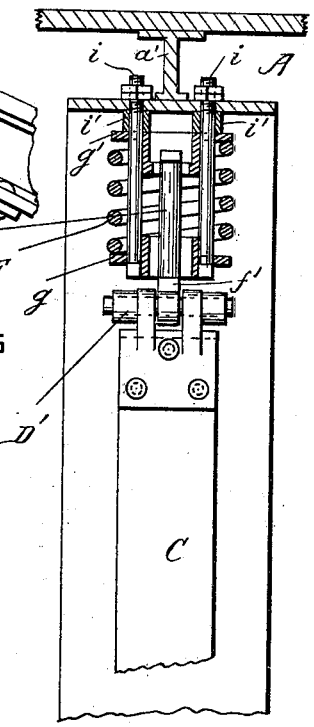
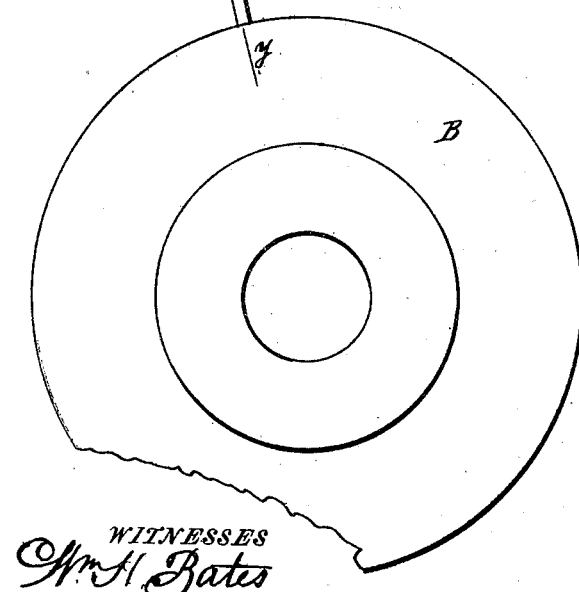
WITNESSES
Wm H Bates
Charles H Gray.
INVENTOR
Gustaf A. Anderson.
by Herbert W. T. Jenner.
Attorney

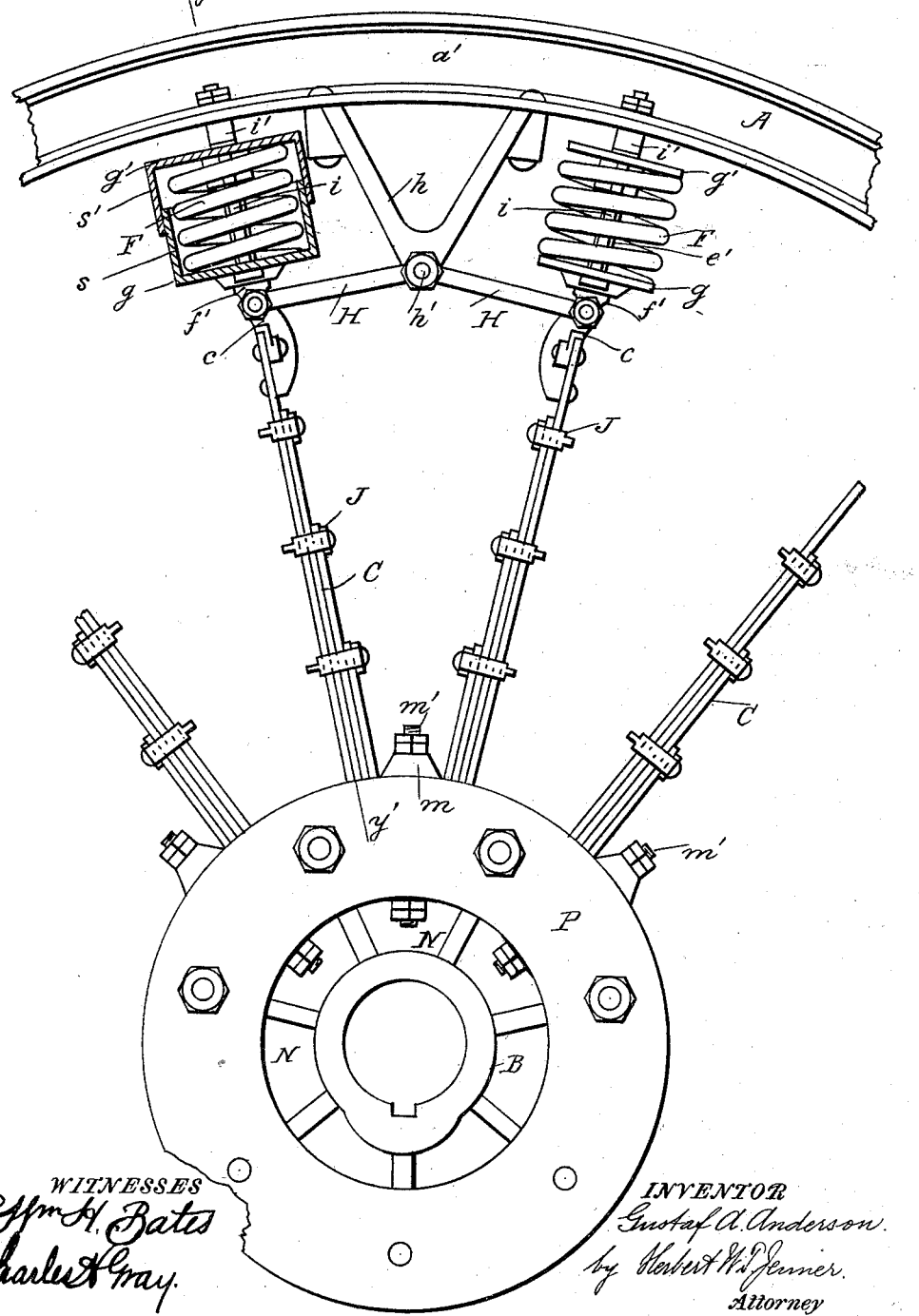

No. 624,725. Patented May 9, 1899.
G. A. ANDERSON.
SPRING WHEEL.
(Application filed Sept. 24, 1898.)
(No Model.) 5 Sheets—Sheet 5.

WITNESSES
Wm H Bates
Charles W Gray

INVENTOR
Gustaf A. Anderson.
by Herbert W. T. Jenner
Attorney

UNITED STATES PATENT OFFICE.

GUSTAF ARVID ANDERSON, OF WAYNESBOROUGH, PENNSYLVANIA, ASSIGNOR TO THE GEISER MANUFACTURING COMPANY, OF SAME PLACE.

SPRING-WHEEL.

SPECIFICATION forming part of Letters Patent No. 624,725, dated May 9, 1899.

Application filed September 24, 1898. Serial No. 691,793. (No model.)

*To all whom it may concern:*

Be it known that I, GUSTAF ARVID ANDERSON, a citizen of the United States, residing at Waynesborough, in the county of Franklin and State of Pennsylvania, have invented certain new and useful Improvements in Spring-Wheels; and I do hereby declare the following to be a full, clear, and exact description of the invention, such as will enable others skilled in the art to which it appertains to make and use the same.

This invention relates to spring-wheels for traction-engines and other vehicles; and it consists in the novel construction and combination of parts hereinafter fully described and claimed.

Figure 8:
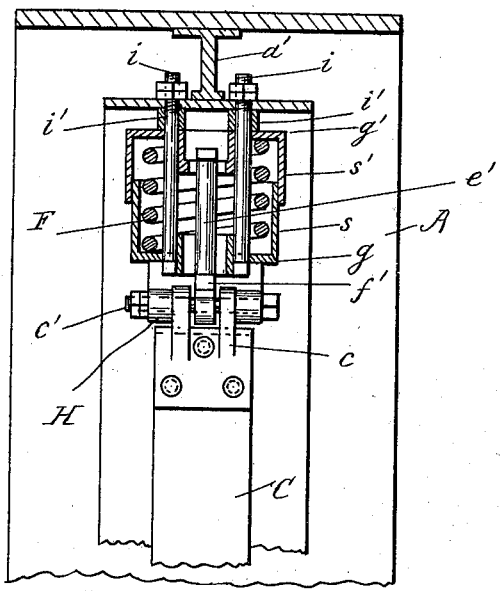
Figure 9:
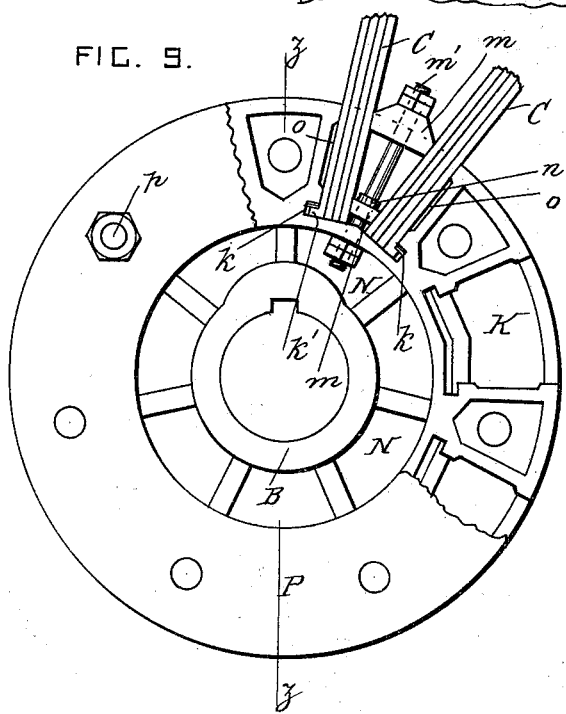
Figure 10:
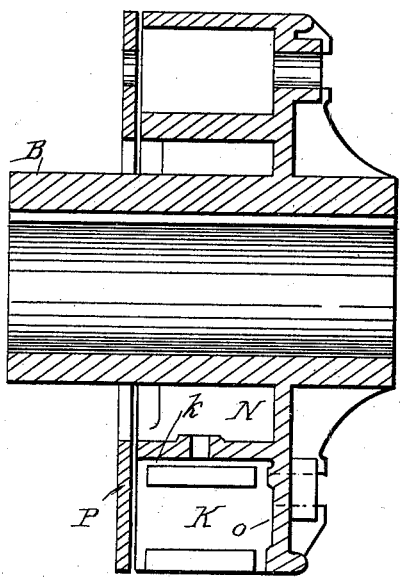

In the drawings, Figure 1 is a side view of a portion of a light and simple form of spring-wheel. Fig. 2 is a cross-section taken on the line $x\,x$ in Fig. 1. Fig. 3 is a side view of a portion of a heavier form of spring-wheel. Fig. 4 is a cross-section taken on the line $x'\,x'$ in Fig. 3. Fig. 5 is a side view showing a modification of the heavier spring-wheel. Fig. 6 is a cross-section taken on the line $y\,y$ in Fig. 5. Fig. 7 is a side view showing a second modification of the heavier spring-wheel. Fig. 8 is a cross-section taken on the line $y'\,y'$ in Fig. 7. Fig. 9 is a side view showing in detail how the spokes of any of the said wheels may be secured to the hub. Fig. 10 is a cross-section taken on the line $z\,z$ in Fig. 9.

A is the rim of the wheel, and B is its hub, which is mounted on a shaft or axle in any approved manner.

C are spring-spokes, which are secured to the hub at one end. The spring-spokes are made of any approved resilient material, such as steel, and they are of any approved form. The free ends of the spring-spokes are connected to the wheel-rim by spring connections, which are pivoted to the free ends of the said spokes.

In the simple form of wheel shown in Figs. 1 and 2 the free ends of the spokes are connected to the rim by spring-bars D, which are rigidly secured at one end to the rim by rivets or bolts. The free ends of the spokes are connected to the free ends of the bars D by pivot-pins $d$, and the said bars operate both as springs and as guides, which constrain the free ends of the spokes to move in certain planes. The spring-bars D are normally arranged substantially at a right angle to the spokes to which they pertain. When a load comes on the axle, all the spring-spokes and the spring-bars bend, but in different proportions, according to their positions in the wheel. When the wheel is used as a driving-wheel, the spring-bars pull or push the rim, according to the direction of motion. The spring-bars may all be arranged in one direction, or some of them may be arranged in one direction and others in the reverse direction. The spring-bars D can be connected to the spokes under an initial tension, if desired, to make the axle ride steadier.

In the form shown in Figs. 3 and 4 the spring connections between the spokes and the rim consist of springs and guides formed separate from each other. The guides consist of brackets E, bolted or otherwise secured to the rim, and plungers $e$, which slide longitudinally in the said guide-brackets. The plungers are preferably arranged radial to the axis of the wheel. The free ends of the spring-spokes C are provided with double eyes $c$, and $c'$ are pins which project through slots in the guide-brackets and pivot the double eyes to the plungers. Each guide-bracket has a chamber $f$, and F is a helical spring arranged within the said chamber or cylinder, which forms a casing for it. Each plunger has a shoulder $f'$, and $g$ is a plate which bears against the said shoulder and against the inner end of the spring F. A plate $g'$ is arranged between the outer end of the spring F and the wheel-rim and is provided with a recess $h$.

G is a screw which engages with the end of the plunger. The screw G is turned so as to give the spring F a prearranged initial tension.

The load deflects all the spring-spokes and the helical springs, but unequally, according to their positions in the wheel, and the helical springs are always in compression. When the plungers move radially toward the axis of the wheel, they compress the springs F by pulling the plates $g'$ downward, and when the plungers move radially away from the axis of the wheel they compress the spring F by pushing the plates $g$ upward.

In the modification shown in Figs. 5 and 6 the guides consist of spring-bars D' instead of guide-brackets. The spring-bars operate as guides the same as the spring-bars D shown in Figs. 1 and 2; but the spring-bars D' only partially form the spring connection between the spokes and the rim. The spring-bars D' are reinforced by helical springs F and plates $g$ and $g'$ the same as described with reference to Figs. 3 and 4, the plates $g$ being supported from the rim of the wheel and free to move toward it. The free ends of the spring-bars or guides D' are pivoted to the free ends of the spring-spokes and to plungers or bolts which are connected to the plates $g'$, so as to compress the springs F, as hereinbefore described.

In the modification shown in Figs. 7 and 8 the guides for the free ends of the spring-spokes consist of links H. These links are pivoted at one end to double eyes $c$ on the ends of the spokes and are pivoted at the other end to brackets $h$ by pins $h'$. The brackets $h$ are secured to the rim of the wheel in any approved manner. The pins $c'$ also pivot the spokes to bolts or plungers $e'$. Springs F and plates $g$ and $g'$ are arranged between the ends of the spring-spokes and the rim, substantially as hereinbefore described. Instead of using a hollow bracket to carry the plate $g$ from the rim two bolts $i$ are used. These bolts $i$ pass through holes in the plates $g$ and $g'$. The bolts $i$ are arranged inside the spring, and $i'$ are collars on the bolts $i$ between the rim and the plate $g'$; but the plate $g'$ may abut against the rim direct, if desired. The bolts $e'$ have T-shaped heads, which are slipped through elongated holes in the plates $g'$ and then turned crosswise of the said holes, so that nuts are not required. The springs F are compressed between the plates $g$ and $g'$ to their prearranged initial tension before the bolts $e'$ are placed in position.

If desired, the plates $g$ and $g'$ can have telescopic casings or cylinders $s$ and $s'$ formed integral with them or secured to them, as shown in Fig. 7, to hide the helical springs and protect them from injury.

When the spokes cannot conveniently be made of single spring-bars, several bars may be connected by clips J to form leaf-springs.

The ends of the spring-spokes are connected to the hub in any approved manner. In traction-wheels the arrangement shown in Figs. 9 and 10 is preferred. Sockets K are formed in the hub, with recesses $k$ at the bottoms of their opposite sides. The spokes have lateral projections $k'$, which engage with the said recesses and are secured by wedges $m$, inserted between each pair of spokes. Bolts $m'$ are provided for tightening the wedges and securing them in place. The wedges and bolts may be arranged in various ways.

N are pockets in the hub below the sockets K for the lower nuts, which secure the bolts $m'$.

Nuts are shown on each end of each bolt $m'$, and the wedges are shown in two parts. The lower and smaller part or wedge is formed on the bolt or if formed separate from the bolt is pressed downward by a collar $n$ on the bolt. This lower part or wedge is first tightened by the nut in the pocket N, and the upper part or wedge is subsequently tightened by the nut on the upper end of the bolt. This insures a good bearing for the spoke at the upper and lower part of the socket, and the middle part of the socket is recessed at $o$, so that there is no labor involved in fitting the end portion of the spoke in position.

P is a cover-plate which is bolted to one side of the hub to cover the open sides of the sockets. The spokes are made a little wider than the sockets, and the plate P bears against the sides of the spokes. The plate P is springy, being formed of steel or other similar material, so that it bends when its bolts $p$ are tightened and adjusts itself so as to bed against and securely clamp the end portion of each spoke without having to be accurately fitted to place.

The wheel-rim is constructed in any approved manner, and for a traction-engine it preferably consists of outer and inner flanges and a web $a'$, bolted or riveted between them.

What I claim is—

1. In a spring-wheel, the combination, with a rim, and a hub; of leaf-springs rigidly secured to the hub and constituting the wheel-spokes, spring connections carried by the rim, pivot-pins operatively connecting the free end portions of the said leaf-springs with the said spring connections, and means for restraining the said rim and hub from having relative motion except in the plane in which the wheel revolves, substantially as set forth.

2. In a spring-wheel, the combination, with a rim, and a hub, of leaf-spring spokes rigidly secured to the hub, helical springs carried by the said rim and pivotally connected with the free end portions of the said spokes, and guides constraining the free end portions of the said spokes to move substantially radial of the hub, substantially as set forth.

3. In a spring-wheel, the combination, with a rim, and a hub; of spring-spokes projecting from the hub, helical springs arranged between the said spokes and rim, means for supporting the inner ends of the said springs from the said rim, and connections between the outer ends of the said springs and the said spokes, whereby the said springs always work in compression, substantially as set forth.

4. In a spring-wheel, the combination, with a rim, and a hub; of spring-spokes projecting from the hub, helical springs having their inner and outer ends operatively connected with the said rim and spokes respectively so that the said springs always work in compression, and guides connected with the said rim and constraining the ends of the spring-spokes to move in prearranged planes, substantially as set forth.

5. In a spring-wheel, the combination, with a rim, and a hub; of spring-spokes projecting from the hub, springs arranged between the said spokes and rim, and individual casings inclosing the said springs, substantially as set forth.

6. In a spring-wheel, the combination, with a rim, and a hub; of a spring-spoke projecting from the hub, a plunger or bolt pivotally connected to the free end of the said spoke, a helical spring, a plate bearing on the outer end of the said spring and slidable inwardly upon the said plunger or bolt, a plate bearing against the inner end of the said spring and slidable outwardly upon the said plunger or bolt, and means for supporting the last said plate from the wheel-rim, substantially as set forth.

7. In a spring-wheel, the combination, with a rim, and a hub; of spring-spokes projecting from the hub, a plunger or bolt pivotally connected to the free end of the said spoke, an inner and an outer plate normally slidable toward each other on the said plunger or bolt, the outer movement of the said outer plate being limited by the said rim, a helical spring arranged between the said plates, and bolts engaging with the wheel-rim and extending through the said spring and through holes in the said plates, said bolts operating to limit the inward movement of the said inner plate, substantially as set forth.

8. In a wheel, the combination, with a hub provided with sockets, of spokes arranged in pairs, one pair in each socket, and wedges arranged between the pairs of spokes and securing them in the said sockets, substantially as set forth.

9. In a wheel, the combination, with a hub provided with a socket having recesses in two of its opposite sides, of a pair of spokes provided with projections which engage with the said recesses, and a wedge arranged between the said pair of spokes and securing them in the said socket, substantially as set forth.

10. In a wheel, the combination, with a hub provided with a socket, and a pocket under the socket; of a pair of spokes arranged in the said socket, a wedge between the said pair of spokes, and a fastening-bolt passing through the bottom of the said socket and provided with a nut arranged in the said socket, substantially as set forth.

11. In a wheel, the combination, with a hub provided with a socket, of a pair of spokes arranged in the said socket, two wedges arranged one above the other in the socket between the spokes, and separate means for securing each wedge, thereby securing the spokes in the socket, substantially as set forth.

12. In a wheel, the combination, with a hub provided with sockets which are open on one side, of spokes arranged in the said sockets and projecting at the said open sides thereof, a plate of springy material bearing on the projecting side portions of the said spokes, and means for securing the said plate to the said hub, substantially as set forth.

In testimony whereof I affix my signature in presence of two witnesses.

GUSTAF ARVID ANDERSON.

Witnesses:
 DANIEL S. BEARD,
 J. STOVER PRICE.